United States Patent
Reijersen Van Buuren et al.

(10) Patent No.: US 10,225,989 B2
(45) Date of Patent: Mar. 12, 2019

(54) WRAPPING MATERIAL FEEDING DEVICE AND METHOD WITH CLEANING FUNCTION

(71) Applicant: FORAGE INNOVATIONS B.V., Maassluis (NL)

(72) Inventors: Willem Jacobus Reijersen Van Buuren, Maassluis (NL); Peter Rodewald, Maassluis (NL); Malte Cornelius Schlichting, Maassluis (NL); Rikkert Graafland, Maassluis (NL)

(73) Assignee: Forage Company B.V., Maassluis (NL)

( * ) Notice: Subject to any disclaimer, the term of this patent is extended or adjusted under 35 U.S.C. 154(b) by 787 days.

(21) Appl. No.: 14/769,811

(22) PCT Filed: Feb. 12, 2014

(86) PCT No.: PCT/NL2014/050081
§ 371 (c)(1),
(2) Date: Aug. 22, 2015

(87) PCT Pub. No.: WO2014/129891
PCT Pub. Date: Aug. 28, 2014

(65) Prior Publication Data
US 2015/0373917 A1 Dec. 31, 2015

(30) Foreign Application Priority Data

Feb. 22, 2013 (NL) ..................................... 2010352

(51) Int. Cl.
*A01F 15/07* (2006.01)
*B65B 41/12* (2006.01)
(Continued)

(52) U.S. Cl.
CPC ........... *A01F 15/0715* (2013.01); *A01F 15/07* (2013.01); *A01F 15/071* (2013.01); *A01F 15/08* (2013.01);
(Continued)

(58) Field of Classification Search
CPC ......... B65B 63/04; B65B 41/12; B65B 41/16; A01F 15/07; A01F 15/071; A01F 15/0715; A01F 2015/077; A01F 15/08
(Continued)

(56) References Cited

U.S. PATENT DOCUMENTS 5,129,208 A * 7/1992 Van Zee ............. A01F 15/0715
53/118
5,231,828 A * 8/1993 Swearingen ........ A01F 15/0715
100/5
(Continued)

FOREIGN PATENT DOCUMENTS

DE 195 39 297 C1 4/1997
DE 10 2004 023 701 A1 12/2005
(Continued)

*Primary Examiner* — Hemant M Desai
*Assistant Examiner* — Mobeen Ahmed

(57) ABSTRACT

A feeding apparatus and a feeding method are disclosed. The apparatus and the method feed wrapping material towards an inlet of a chamber. An object in this chamber is to be wrapped with wrapping material injected into the chamber. A wrapping material supplying unit supplies wrapping material from a reservoir towards the inlet such that a loose end area is formed. A drive drives a conveying surface of a wrapping material feeding unit either in a feeding direction or in a cleaning direction. If moved in the feeding direction, the conveying surface conveys the loose end area towards the inlet. If moved in the cleaning direction, the conveying surface cleans the inlet from debris.

17 Claims, 4 Drawing Sheets

(51) Int. Cl.
 *A01F 15/08* (2006.01)
 *B65B 63/04* (2006.01)
 *B65B 41/16* (2006.01)

(52) U.S. Cl.
 CPC ......... *A01F 2015/077* (2013.01); *B65B 41/12* (2013.01); *B65B 41/16* (2013.01); *B65B 63/04* (2013.01)

(58) Field of Classification Search
 USPC ...... 53/397, 399, 430, 118, 587, 588, 389.4, 53/389.5; 100/5, 87, 88
 See application file for complete search history.

(56) References Cited

U.S. PATENT DOCUMENTS

| | | | |
|---|---|---|---|
| 5,433,059 A | 7/1995 | Kluver et al. | |
| 5,768,986 A * | 6/1998 | Arnold | A01F 15/18 100/88 |
| 6,021,622 A * | 2/2000 | Underhill | A01F 15/0715 53/118 |
| 6,109,553 A * | 8/2000 | Hruska | A01F 29/005 241/189.1 |
| 6,446,548 B2 * | 9/2002 | Chow | A01F 15/141 100/13 |
| 7,404,356 B2 * | 7/2008 | Viaud | A01F 15/07 100/87 |
| 2007/0290087 A1 * | 12/2007 | Weiss | A01F 29/005 241/101.76 |
| 2010/0155513 A1 * | 6/2010 | Brick | A01F 29/005 241/30 |
| 2011/0067374 A1 * | 3/2011 | James | A01F 15/0715 56/341 |
| 2013/0305937 A1 * | 11/2013 | Roberge | A01F 15/0705 100/40 |

FOREIGN PATENT DOCUMENTS

| | | |
|---|---|---|
| DE | 10 2004 023 758 B4 | 3/2007 |
| DE | 36 17 155 A1 | 2/2011 |
| DE | 102 43 294 B4 | 6/2011 |
| EP | 1 400 163 A1 | 3/2004 |
| EP | 1 808 065 A1 | 7/2007 |
| WO | WO 2011/018455 A1 | 2/2011 |
| WO | WO 2011/033494 A1 | 3/2011 |

* cited by examiner

WRAPPING MATERIAL FEEDING DEVICE AND METHOD WITH CLEANING FUNCTION

BACKGROUND

The invention refers to a feeding apparatus and a feeding method for feeding wrapping material towards an inlet of a chamber. The wrapping material has to be injected through the inlet into the chamber. An object in this chamber has to be wrapped with the injected wrapping material.

The problem solved by the invention occurs in particular in a round baler for loose agricultural crop material which picks up the material from the ground, forms a round-cylindrical bale from this material in a pressing chamber, wraps the bale in the chamber into a net made of twine or yarn, and ejects the wrapped bale.

DE 3617155 A1 discloses a baler which creates a round bale (Erntegutballen 8) and wraps the created bale with a wrapping element (Hüllenelement 13). The bale 8 is created by endless belts. FIG. 2 shows one endless belt (Wickelelement 5) which is guided around several rollers 4 and a drive roller (Antriebswalze 9) which is in contact with the bale. A loose end of the wrapping element 13 (dotted lines in FIG. 2 to FIG. 5) is grasped by a clamping device (Klemmeinrichtung 26) mounted on an activation lever (Betätigungshebel 25), cf. FIG. 2 to FIG. 6, and is conveyed and guided by a feeding mechanism (Zuführmechanismus 15). The wrapping element is guided by a guide roller (Führungswalze 35) and is clamped between a clamping strip (Klemmleiste 29) with a rubber plate (Gummiplatte 34), cf. FIG. 6. The cutting device (Schneidvorrichtung 16) has a cutting knife (Trennmesser 44) which can be rotated from a parking position (Ruhestellung A, FIG. 3) into a cutting position (Schnittstellung B, FIG. 2). In order to wrap a bale, a lever apparatus (Gestänge 20) with the clamping device 26 is pivoted from a parking position (obere Ausgangsstellung C) into an operating position (angeschwenkte Lage E, FIG. 4) and pulls wrapping material 13 with a defined length (Vorlauflänge) from a reservoir (Vorratsrolle 14). The cutting device 16 is transferred into its parking position A. The loose end 13a of the wrapping element 13 lies on the fed material 54 or on a holding-down device (Niederhalter 55). Afterwards the loose end 13a is taken by the surface 12 of a so-called starter roller (Starterwalze 11). This starter roller 11 is not in contact with a bale and conveys the wrapping element 13 through a nip (Spalt 37) between the starter roller 11 and the drive roller 9. The lever apparatus 20 remains in the operating position E of FIG. 4 until the defined length of the wrapping material 13 is pulled off.

In DE 102004023701 A1 a bale is created in a bale chamber (Ballenkammer 3). A bale creating apparatus (Ballenformeinrichtung 2) is conveyed by means of a driven roller (Antriebsrolle 7). The bale (Erntegutballen 29) is further rotated by two rollers 11, which are in contact with the bale 29, cf. FIG. 2. Wrapping material 28 is pulled out of a reservoir (Vorratsspeicher 27), cf. FIG. 2, and is guided around deflecting rollers (Umlenkrollen 50, 48, 47) and a guiding plate (Führungsplatte 37). The roller 48 is mounted on a lever arm (Hebelarm 49). This lever arm 49 is mounted on a further lever arm 51 and is rotated by a positioning apparatus (Stellmittel 31). A cutting device with a cutting arm (Schwenkarm 34) and parts 39, 41 is also connected the positioning apparatus 31. A conveying element (Förderelement 38) takes the loose end of the wrapping material 28 and shifts it towards one roller 11. The feeding element 38 has the form of a roller with cross-conveying edges (Querförderkanten 38.1). The wrapper material 28 is grasped by a roller 11 and the rotating bale 29, cf. FIG. 1. After the bale 29 is entirely wrapped, the positioning device 31 rotates the cutting device 34, 39, 41.

In DE 102004023758 B4 a baler 1 is described which creates a bale in a pressing chamber (Ballenkammer 3). A wrapping device (Wickelvorrichtung 26) wraps the bale (Erntegutballen 29). The wrapping material 28 is guided around the deflection means (Umlenkungen 50, 48, 47), cf. FIG. 2 and FIG. 3. An actor (Stellmittel 31) moves on its free side 32 a lever arrangement (Hebelanordnung 33) with a pivot arm (Schwenkarm 34), cf. FIG. 2 and FIG. 3. A guiding plate (Führungsplatte 37) can be pivoted with respect to the pivot arm 34. A cutting device (Teile 39, 41 einer Schneidvorrichtung) at the pivot arm 34 and a knife (Schneidestange 42) cut the wrapping material 28. The wrapping material 28 is further guided by means of a guiding element (Förderelement 38) having the shape of a roller. This guiding roller 38 guides the wrapping material 28 towards the inlet (Einlass 5) to the chamber 3. This inlet 5 extends between two parallel rollers 11. The guiding roller 38 has cross protrusions (Querförderkanten 38.1). The deflection means 50, 48, 47 act as a buffer storage for the wrapping material 28 and prevents that too much wrapping material 28 is pulled from the reservoir (Vorratsspeicher 27).

In WO 2011018455 A1 a round baler 10 is described. The bale forming chamber is defined by an apron assembly 28 with conveying units (slats 33) which convey the bale in the chamber and make the bale rotating in a first direction. A floor roller 26 also conveys the bale in the first direction. Material is injected into the chamber through a traverse inlet 25. Wrapping material n is supplied from a reservoir 23 and is fed through the inlet 25 into the chamber. A further roll 27 called stripper roller extends along the width of the chamber rotates in a second direction which is opposite to the first direction in which the bale is rotated. This stripper roller 27 guides wrapping material n towards the bale in the chamber, cf. FIG. 7, and helps to inject the wrapping material n through a nip above the stripper roller 27.

In WO 2011018455 A1 the problem is addressed that wrapping material n may be attached to the stripper roller 27 and wraps the stripper roller 27 and not the bale in the chamber. To solve this problem the stripper roller 27 is divided into several segments 100 along the rotational axis of the stripper roller 27, cf. FIG. 2 and FIG. 3. Stationary plates 103 are mounted between these segments 100. Every plate 103 has a cam-like protrusion 105.

DE 3617155 A1, DE 102004023701 A1, DE 102004023758 B4, and WO 2011018455 A1 do not address at all the problem that material from the bale can become an obstacle which prevents wrapping material from being conveyed towards the surface of the bale.

WO 2011033494 A1 discloses a round baler in which at least one compression belt 18 defines a bale forming chamber. An inlet 37 for wrapping material 39 is formed between a bale forming roller 32 and the compression belt 18, cf. FIG. 1. A dispenser 38 is carried on a pair of mounting plates 40 and dispenses wrapping material 39. The dispensed wrapping material 39 is transported and conveyed downwards onto a deflecting roller 42. This deflecting roller 42 is arranged spaced apart from the inlet 37 and feeds the wrapping material 39 towards the inlet 37. The roller 42 is driven in the direction G. The deflecting roller 42 is carried between two carrier plates 43 and can be pivoted between a deflecting position and an idler position, cf. FIG. 4ff. For pivoting the deflecting roller 42 the two plates 43 are pivoted either in a direction H (from deflecting state into idler state)

or in a direction J (from idler state into deflecting state), see FIG. 6. This movement changes the distance between the deflecting roller 42 and the inlet 37.

DE 10243294 B4 and EP 1400163 A1 describe a baler for producing round bales. The bale is created in a pressing chamber (Pressraum 5) by means of a conveying and pressing belt (Förder- and Pressriemen 9) and several pressing rollers 6, 7, 8 being in contact with material guided into the pressing chamber 5. Loose crop material to be pressed is supplied by a pick-up unit (Aufsammler 15) and a feeding unit (Förder-/Schneidrotor 16) through a feeding aperture (Zuführöffnung 14) into the pressing chamber 5. The bale is wrapped with wrapping material (Umhüllmaterial 22) which is stored in a reservoir (Vorratsbehälter 19) containing a wrapping material reel (Umhüllmaterialrolle 20). Two pulling rollers (Vorzugswalzen 21) pull the wrapping material 22 from the reel 20. A loose end (freies Vorlaufende 26) of the wrapping material 22 sags. A feeding roller (Zuführwalze 25) shifts the sagging wrapping material toward the pressing roller 8. The loose end 26 is guided into the pressing chamber 5 through a nip (Einführspalt 23) between the pressing roller 8 and a roller 24 around which the belt 9 is guided.

The feeding roller 25 can be shifted or pivoted between a parking position 27 which is shown in dotted lines and an operating position 29 shown in continuous lines. By shifting or pivoting the feeding roller 25 into the parking position 27 the nip 23 between the feeding roller 25 and the driven roller 8 is enlarged. Debris and other undesired material in the nip 23 drops into the feeding unit. In the embodiment of FIG. 2 the pulling roller 21 and the feeding roller 25 (in FIG. 2: roller 30) are integrated into an assembly (Baueinheit 32) which can be rotated around the axis 33. FIG. 3 shows an embodiment where this assembly unit is shifted and not rotated. The feeding roller 25 can be pivoted from a parking position 27 into an operating position 29, cf. EP 1400163 A1, col.3/l.41-55. As an alternative embodiment the feeding roller 25 can be shifted laterally, cf. col.3/l.56-58. It is also possible to invert the rotating direction of the feeding roller 25, cf.col.3/l.58-col.4/l.2.

The invention described in DE 10243294 B4 and EP 1400163 A1 solves the problem of removing debris from an injection nip. This baler requires a feeding roller which can be rotated as well as shifted laterally and perpendicular to its rotation axis.

Problem, Solution

Therefore it is an object of the invention to provide a feeding apparatus and a feeding method for feeding wrapping material towards an inlet of a chamber in which an object is to be wrapped with wrapping material injected into the chamber wherein a wrapping material feeding unit succeeds in conveying the wrapping material towards the inlet even if debris may have polluted the inlet and wherein the need of enlarging and narrowing a nip between conveying elements is avoided.

The problem is solved by a feeding apparatus with the features of claim 1 and a feeding method with the features of claim 14. Preferred embodiments are specified in the dependent claims.

An object in a chamber is to be wrapped automatically into wrapping material which is injected through an inlet into the chamber. The apparatus and the method according to the invention feed the wrapping material towards this inlet.

The feeding apparatus according to the invention comprises
  a wrapping material supplying unit,
  a wrapping material feeding unit with a conveying surface and
  a drive for the wrapping material feeding unit.

The wrapping material supplying unit can be operated in an operating mode and in a waiting mode. The feeding apparatus performs a feeding procedure in which the wrapping material supplying unit is operated in the operating mode. The feeding apparatus further performs a cleaning procedure in which the wrapping material supplying unit is operated in the waiting mode.

When operated in the operating mode, the wrapping material supplying unit supplies wrapping material from a reservoir. A loose end area of the supplied wrapping material is formed while the wrapping material supplying unit is operated in the operating mode. This loose end area is to be conveyed towards the inlet and to be injected through an inlet into the chamber.

When operated in the waiting mode the wrapping material supplying unit does not supply wrapping material but inhibits wrapping material from being conveyed. The wrapping material supplying unit holds the wrapping material and in particular the sagging loose end area and keeps the wrapping material in a distance away from the inlet.

The wrapping material feeding unit has a conveying surface. For conveying wrapping material towards the inlet, this conveying surface is moved along a first endless loop in a feeding direction. The loose end area increases and reaches the moved conveying surface. As soon as the loose end area is long enough, the conveying surface touches and conveys the loose end area. Being touched and conveyed causes the loose end area of wrapping material being conveyed towards the inlet as the loose end area is in contact with the conveying surface.

The same conveying surface of the wrapping material feeding unit is moved along a further endless loop in a cleaning direction. This cleaning direction is different from the feeding direction. The conveying surface moved in the cleaning direction conveys and transports loose material, e.g. debris, away from the inlet such that this material cannot cause a blockade of the feeding apparatus.

The wrapping material supplying unit and the wrapping material feeding unit are synchronized as follows:
  While the wrapping material supplying unit is in the operating mode and supplies wrapping material, the conveying surface is moved in the feeding direction.
  While the conveying surface is moved in the cleaning direction, the wrapping material supplying unit is kept in the waiting mode.

The drive for the wrapping material feeding unit effects the movement of the conveying surface in the cleaning direction and also in the feeding direction.

Advantages

One basic idea of the invention is to clean actively and automatically the inlet and to use the wrapping material feeding unit additionally for this active cleaning. No manual clearing operation and no specific cleaning device are required.

The feeding apparatus and the feeding method according to the invention actively remove debris polluting the inlet. If not removed, this pollution may block an area adjacent to the inlet and may inhibit the wrapping material from being conveyed through the inlet into the chamber. Therefore the invention prevents a blockade of a wrapping apparatus for wrapping an object in the chamber. The invention therefore ensures that wrapping material is injected through the inlet into the chamber and the object in the chamber is wrapped. Thanks to the invention this desired function is also achieved if the conveyed wrapping material itself cannot remove the debris, e.g. because the wrapping material has a very low stiffness, in particular if the wrapping material is made of twine or yarn or has the form of a net. The invention allows feeding wrapping material in a dirty environment, e.g. on an agricultural field.

The inlet for injecting wrapping material into the chamber often has the form of a narrow nip. Often only a narrow nip prevents loose material in the chamber from being pressed out of the chamber, in particular if the object is a bale formed by pressing loose agricultural material. A broader nip can therefore often not be implemented. Or the available space or the properties of the wrapping material require providing a narrow nip. Such a narrow nip is in danger of being polluted by debris. Thanks to the invention this narrow nip is actively cleaned.

A feeding apparatus and a feeding method according to the invention neither requires a drive nor a guide unit for enlarging and narrowing such a nip between the wrapping material feeding unit and a wrapping material injection unit for injecting the loose end area through the inlet into the chamber. Thanks to the invention this nip is actively cleaned by moving the conveying surface in the cleaning direction. The nip needs not to be enlarged for cleaning purposes. Therefore the invention saves space which would otherwise be required for enlarging the nip by pivoting or shifting the wrapping material feeding unit. In addition the invention saves mechanical and/or hydraulic parts for enlarging the nip. As no wrapping material feeding or conveying unit needs to be shifted laterally, the bearing for the wrapping material feeding unit can be implemented in an easy way. It suffices that the roller of the wrapping material feeding unit can be rotated around its own rotational axis in two directions without the possibility of lateral shift or a pivotal movement of the roller.

In contrast to cleaning the nip by enlarging it, the invention also does not rely on the force of gravity for removing debris from the inlet and/or out of the nip. A rigid object blocking the nip may be broader than the nip even after enlarging the nip. Thanks to the invention also such a rigid object is conveyed away from the inlet.

The invention also does not require a pushing unit, in particular not a plunger, which pushes loose material out of this nip and by a linear movement removes debris. In contrast to a pusher element which necessarily oscillates, the invention enables implementing a continuous cleaning procedure as the conveying surface is moved along an endless loop. A pusher element may damage the wrapping material or the object to be wrapped. To avoid such an undesired effect, the operation of a pusher element must be monitored. Thanks to the invention such a monitoring is not required. The invention also does not require a blower or a sucking unit for cleaning the inlet.

Thanks to the invention no additional cleaning unit is required for removing pollution and for cleaning the inlet, even if the inlet has the form of a narrow nip. The pollution is removed by the same conveying surface which also conveys the wrapping material towards the inlet. The invention therefore saves a further unit of the feeding apparatus only used for cleaning purposes. As the same conveying surface of the same wrapping material feeding unit is used for feeding wrapping material and for permanently cleaning the inlet, no sensor for detecting debris in the inlet and no activation unit for such a specific unit are required. An optical sensor has the big disadvantage that the sensor may also be polluted and can no longer work properly. In addition an optical sensor requires an evaluating unit.

Thanks to the invention no specific cleaning step before starting the wrapping procedure is required. Such a cleaning step requires time. In contrast to a specific cleaning step the cleaning performed by the wrapping material feeding unit may be performed in parallel with other operations, e.g. in parallel to or at least timely overlapping with forming an object in the chamber.

According to the invention the cleaning procedure performed by the conveying surface is synchronized with the operation of the wrapping material supplying unit. As long as the wrapping material supplying unit supplies wrapping material, the conveying surface is moved in the feeding direction. The cleaning procedure is performed when no wrapping material has to be conveyed and time for cleaning is available. The invention enables to perform the cleaning procedure as long as possible.

While the wrapping material supplying unit is kept in the waiting mode, the conveying surface is moved in the cleaning direction and removes debris. If the object is formed and afterwards wrapped in the chamber, the conveying surface therefore cleans the inlet while the object is formed. By this feature a maximal cleaning effect is achieved.

Thanks to the invention the wrapping material feeding unit needs not to be shifted in the cleaning direction for enabling a cleaning procedure. It suffices to implement the wrapping material feeding unit with a stationary roller which can only be rotated around its own rotating axis. This saves a drive for shifting the wrapping material feeding unit and saves place for the wrapping material feeding unit which would otherwise be needed for taking the shifted wrapping material feeding unit. A compact construction of the feeding apparatus can be achieved thanks to the invention.

The invention can in general easily be integrated into an existing feeding apparatus and therefore into an existing wrapping arrangement with a feeding apparatus. An existing feeding apparatus often has a wrapping material feeding unit comprehending a conveying surface and a controlled drive for this conveying surface. This conveying surface is adapted for conveying the wrapping material in the feeding direction towards the inlet. To implement the invention the existing wrapping material feeding unit only needs to be amended such that the existing conveying surface can additionally be conveyed in the cleaning direction in a controlled manner. This only requires amending the drive—or a transmission for the drive—and a control unit for this drive. Besides a part for changing the conveying direction of the drive no additional mechanical part is needed. No further space in the feeding apparatus is required for implementing the invention.

The feeding apparatus and the feeding method according to the invention may be used in a wrapping apparatus with a chamber. An object to be wrapped is either created in or transported to this chamber. Wrapping material is supplied and injected into this chamber by means of the feeding apparatus and the feeding method according to the invention.

PREFERRED EMBODIMENTS

According to the invention the feeding apparatus is operated in one mode and is transferred into a further mode wherein at least two different modes are used:

First mode: The wrapping material supplying unit is in the operating mode and conveying surface is moved in the feeding direction.

Second mode: The wrapping material supplying unit is in the waiting mode and the conveying surface is moved in the cleaning direction.

In one embodiment the feeding apparatus can be transferred first from the second mode into the first mode and afterwards from the first mode into a third mode: The wrapping material supplying unit is in the waiting mode and the conveying surface is moved in the feeding direction.

The feeding apparatus is transferred into this third mode in particular if the front portion of the wrapping material has already been injected through the inlet into the chamber. The wrapping material feeding unit ensures that the web of wrapping material is further injected. After a given time span the feeding apparatus is switched into the second mode.

In order to clean the area adjacent to the inlet as long as possible the feeding apparatus can in one embodiment be operated in a fourth mode: The wrapping material supplying unit is already in the operating mode and conveys wrapping material. The conveying surface is still moved in the cleaning direction. This fourth mode is applied in the beginning of a wrapping procedure. The operation in the fourth mode is finished and the conveying surface is moved in the feeding direction (first mode) as late as possible and before the increasing loose end area of the wrapping material reaches the conveying surface.

In one embodiment the conveying surface is permanently moved either in the cleaning direction or in the feeding direction. In a further embodiment the conveying surface is temporarily not moved at all in a time period between being moved in the cleaning direction and being moved in the feeding direction.

In a preferred embodiment the drive for the conveying surface is connected with the wrapping material supplying unit in a mechanical or electronic manner, e.g. by means of a mechanical switch or an electronic control unit controlling both units. This wrapping material supplying unit is operated either in the operating mode or in the waiting mode. The control unit switches the wrapping material supplying unit into the operating mode if an object in the chamber is to be wrapped. The wrapping material supplying unit supplies wrapping material. Switching the wrapping material supplying unit into the operating mode additionally causes the conveying surface to be moved no longer in the cleaning direction but in the feeding direction.

The wrapping material supplying unit is switched from the operating mode back into the waiting mode before or as soon as an object in the chamber is entirely wrapped. Preferably the wrapping material supplying unit is shifted into the waiting mode as soon as the wrapping material is supplied or conveyed by a further means, e. g. pulled by the rotating object itself. The conveying surface is permanently or at least temporally moved in the cleaning direction while the wrapping material supplying unit is operated in the waiting mode. As no wrapping material has to be injected into the chamber while the wrapping material supplying unit is in the waiting mode, this idler time is used for cleaning the inlet. This embodiment further saves time as no additional cleaning step is required. The cleaning function is performed as long as possible.

This embodiment enables to move the conveying surface in the cleaning direction as long as possible. This effect increases the cleaning duration and therefore further reduces the risk that debris in the inlet leads to a jam or a blockade of the feeding apparatus.

In one embodiment a cleaning trigger signal is automatically generated. This cleaning trigger signal triggers the event that the conveying surface of the wrapping material feeding unit is moved in the cleaning direction. The cleaning trigger signal is triggered during a wrapping procedure and as soon as or after the wrapping material has reached the surface of the object in the chamber and on the other hand so late that the conveying surface being moved in the cleaning direction cannot remove the wrapping material from the object and can in particular not pull the wrapping material out of the chamber.

In one implementation the cleaning trigger signal is generated as soon as a given time period has passed. This time period starts as soon as the wrapping material supplying unit is switched into the operating mode. In a further implementation the cleaning trigger signal is generated as soon as a given number of layers of wrapping material are placed around the object in the chamber.

It is possible to place at least one further layer around the object after the cleaning trigger signal has been generated and has caused the wrapping material feeding unit to be moved in the cleaning direction.

Generating the cleaning trigger signal too early could yield to an interference with the wrapping procedure in an undesired manner. The cleaning trigger signal is generated in a synchronized manner with completing the wrapping procedure. Preferably the cleaning trigger signal is generated as early as possible, i.e. as soon as the conveying surface is no longer required for conveying the loose end area. This is the case as soon as the wrapping material is grasped by the object to be wrapped and/or by a further unit.

One embodiment to generate the cleaning trigger signal is as follows: After having completed the wrapping procedure a cutting element severs the web of wrapping material. A time period is given. The cleaning trigger signal is generated after the web of wrapping material is severed and the given time period has passed. This embodiment does not require a further sensor.

A further implementation is that a sensor measures the length of the web of wrapping material which the wrapping material conveying unit has conveyed and/or is taken from the reservoir. The web is conveyed along a path with this length. As soon as this measured length reaches a given threshold, the cleaning trigger signal is generated.

In one embodiment first a wrapping trigger signal and then the cleaning trigger signal are generated. This wrapping trigger signal triggers the procedure for wrapping the object and in particular sets the wrapping material supplying unit into the operating mode. In addition the drive is triggered to move the conveying surface in the feeding direction. Preferably the conveying surface is moved in the cleaning direction until the wrapping trigger signal is generated and again after the cleaning trigger signal is generated.

According to the invention the cleaning direction differs from the feeding direction. These two directions may be anti-parallel, i.e. the cleaning direction is opposite to the feeding direction. It is also possible that there is an angle between the cleaning direction and the feeding direction, e. g. a right angle.

In one embodiment the drive for the wrapping material feeding unit moves the conveying surface along two circular loops. If moved in the feeding direction, the conveying surface describes a first circular loop. If moved in the cleaning direction, the conveying surface describes a further circular loop. This embodiment enables a continuous movement of the conveying surface which is only interrupted for changing the conveying direction from the feeding direction into the cleaning direction and vice versa. Only little space is required for the rotating wrapping material feeding unit. Such a continuous movement stresses the wrapping material feeding unit less than an oscillating movement. This embodiment is in particular achieved if the conveying surface forms the circumferential surface of a driven roller.

The wrapping material feeding unit of this embodiment can be implemented by means of a roller, a rotor, a cam, an endless belt or an endless chain, e. g. The conveying surface is the outer, circumferential surface of a part of the wrapping material feeding unit.

Preferably the conveying effect is improved by several protrusions mounted onto the conveying surface. Such a protrusion may have the shape of a traversal rib along the entire width or a part of the conveying surface. The protrusion can be rigid or flexible. A flexible protrusion may engage into a nip to be cleaned. A rigid as well as a flexible protrusion can be mounted on the conveying surface.

Preferably the feeding apparatus is arranged such that there is always a gap between the conveying surface and the wrapping material when the conveying surface is moved in the cleaning direction. Or there is a gap between the conveying surface conveyed in the cleaning direction and the wrapping material at least as long as the wrapping procedure lasts. This gap can be achieved by tensioning the wrapping material or by shifting or pivoting the wrapping material supplying unit holding the wrapping material, e.g. These embodiments prevent an undesired interaction between the wrapping material feeding unit conveyed in a cleaning operation and the wrapping material supplying unit. Such an interaction may lead to a blockage or jam or may damage the wrapping material. The wrapping material feeding unit only touches the wrapping material when the conveying surface is moved in the feeding direction.

Preferably there is also a gap between the conveying surface and the chamber containing the object to be wrapped such that the wrapping material feeding unit does not contact an object to be wrapped in the chamber. In one embodiment a wrapping material injection unit separated from the conveying surface injects the wrapping material into the chamber such that the wrapping material comes into contact with the surface of the object in the chamber. These embodiments further reduce the risk that the wrapping material feeding unit causes damage to the wrapping material.

Preferably a wrapping material injection unit injects the loose end area through the inlet into the chamber. This injection unit facilitates to inject a flexible wrapping material. A gap between this injection unit and the wrapping material feeding unit occurs always or at least as long as the conveying surface is moved in the cleaning direction. This distance inhibits an undesired interaction between the injection unit and the feeding unit moved in the cleaning direction. The injection unit can comprise a pusher plate or a roller. The injection unit preferably penetrates the inlet.

In one embodiment the chamber with the inlet is used for wrapping as well as for forming a bale of loose material, in particular a bale of loose agricultural material. The chamber is therefore a baling chamber as well as a wrapping chamber. This embodiment enables to wrap a bale which would fall apart if being transported out of the chamber before being wrapped. The baling chamber may be of fixed size or may be increased during forming a bale (variable chamber). In an alternate embodiment the object to be wrapped is formed outside the chamber of the wrapping apparatus and is conveyed into the chamber for being wrapped.

The object may be a bale created from agricultural material, e. g. hay, straw, silage, or from waste or recycling material, e.g. cartridge, paper, plastic. The object may also be a rigid body which has to be wrapped. The wrapping material may in particular be a net created from a thread, at least one strand of twine, or a sheet.

The invention can be used as a part of a vehicle, e.g. a propelled or a pulled bale forming apparatus, or of a stationary plant.

These and other aspects of the invention and of the preferred embodiments will be even more apparent from the detailed embodiment as described below and will be elucidated in detail there.

DESCRIPTION OF DRAWINGS

The drawings show an embodiment of the invention which will be described in greater detail in the following.

DESCRIPTION OF EMBODIMENT

In the embodiment the invention is used in a round baler for creating round-cylindrical bales of agricultural material (hay, straw, silage . . . ) by means of a variable round pressing chamber with variable size. A created bale has two parallel circular front faces and a circumferential surface extending between the two front faces.

The baler of the embodiment picks up loose crop material from the ground by means of a pick-up unit and conveys it with a crop material feeding unit. The picked-up crop material is transferred through a material inlet into a drum-shaped pressing chamber (bale forming chamber). The circumferential surface of the pressing chamber is formed by at least one endless belt guided over guiding rollers and/or by a sequence of conveying and pressing rollers. Therefore the crop material in the pressing chamber is surrounded by these conveying belts or rollers. This endless belt or these rollers are driven in one direction and rotates and presses the material such that the pressed material forms a growing bale consisting of crop material. The chamber of the embodiment has a variable size and increases during the process of creating the bale. The invention can in the same way be used in a baler with a fixed chamber.

Figure 1:
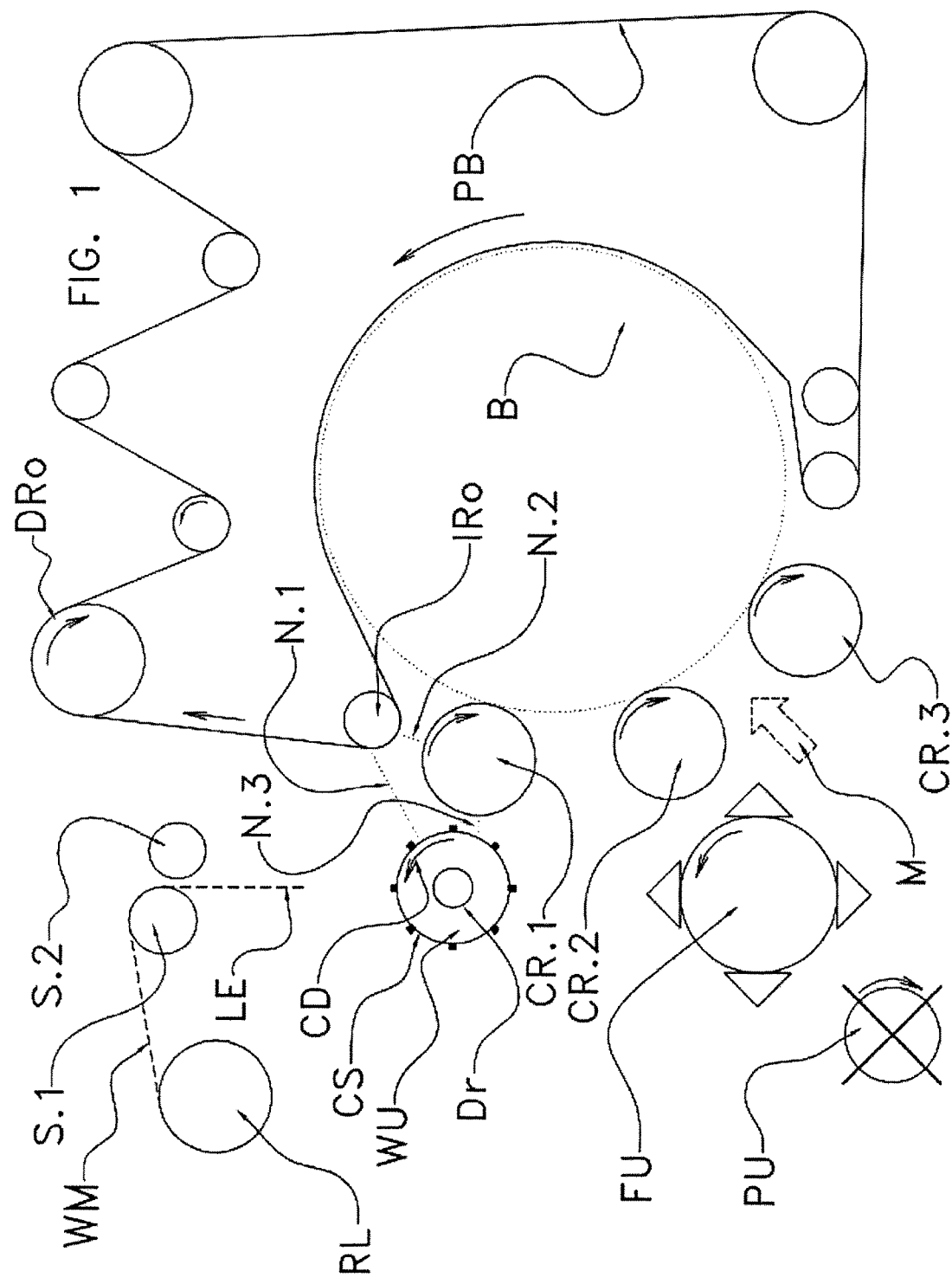
FIG. 1 schematically shows the round-chamber baler of the embodiment during the phase of creating a bale.

FIG. 1 schematically shows such a baler which creates a bale B in a bale forming chamber. This chamber has an approximately cylindrical shape and two side walls (not shown) and is growing as the bale B is created. The symmetrical axis of the bale forming chamber is perpendicular to the drawing plane of FIG. 1. The chamber is formed by at least one pressure belt PB which is guided around a set of rollers. The chamber may be formed by several parallel pressure belts PB. FIG. 1 shows a driven roller DRo, an idler roller IRo, and several other rollers. Some rollers press the pressure belt PB against the bale B in the chamber, e.g. by means of hydraulic cylinders (not shown). The rotational axes of these rollers are perpendicular to the drawing plane of FIG. 1.

A pick-up unit PU with spring-mounted tines picks up crop material from the ground. A crop material feeding unit FU with several rigid feeding rotors conveys the crop material in the direction of the arrow M towards a crop material inlet of the pressing chamber where the chamber is surrounded and formed by the pressing belt PB and by other rollers and/or belts. The crop material in the pressing chamber is conveyed by the pressing belts PB as well as by several conveying rollers (starter rollers) CR.1, CR.2, CR.3 in the anti-clockwise direction. Therefore a rotating and growing bale is created from loose material under pressure in the chamber. The rotation axis of the bale is perpendicular to the drawing plane of FIG. 1 to FIG. 3.

If the created bale B in the chamber has reached a required diameter or pressure or weight or if another given terminating condition is fulfilled, the bale B has to be wrapped by surrounding the bale B with several layers of wrapping material (a pre-manufactured grid or net of twine or a plastic sheet, e. g.) before being ejected out of the pressing chamber. The wrapping material is elastic and has a very low stiffness as it is a net of thin flexible material. The bale B must be kept in the chamber during the wrapping procedure as the bale B outside the chamber being without a wrapping would fall apart.

Figure 2:
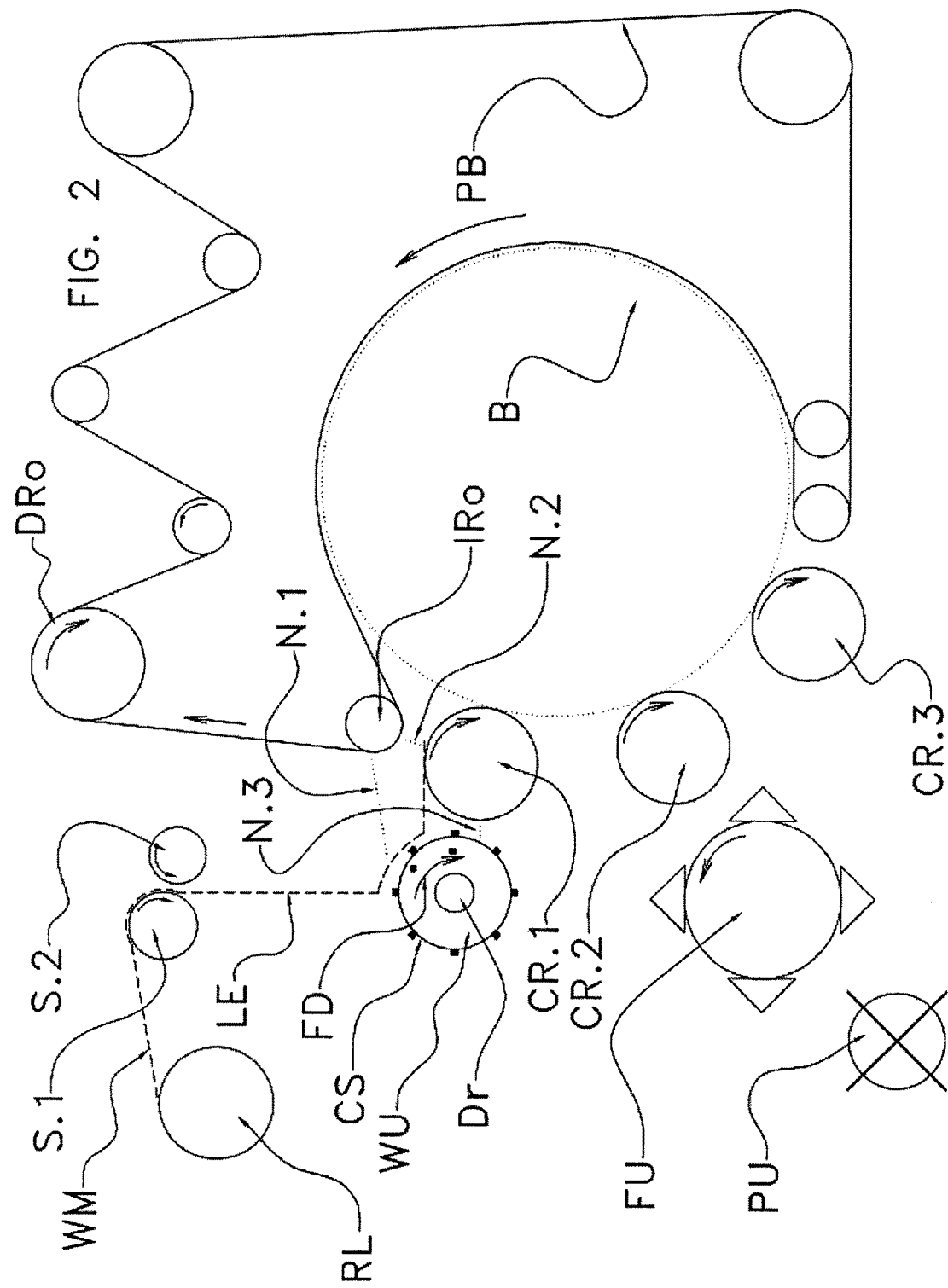
FIG. 2 schematically shows the round-chamber baler of FIG. 1 after having created the entire bale and before wrapping this bale.
Figure 3:
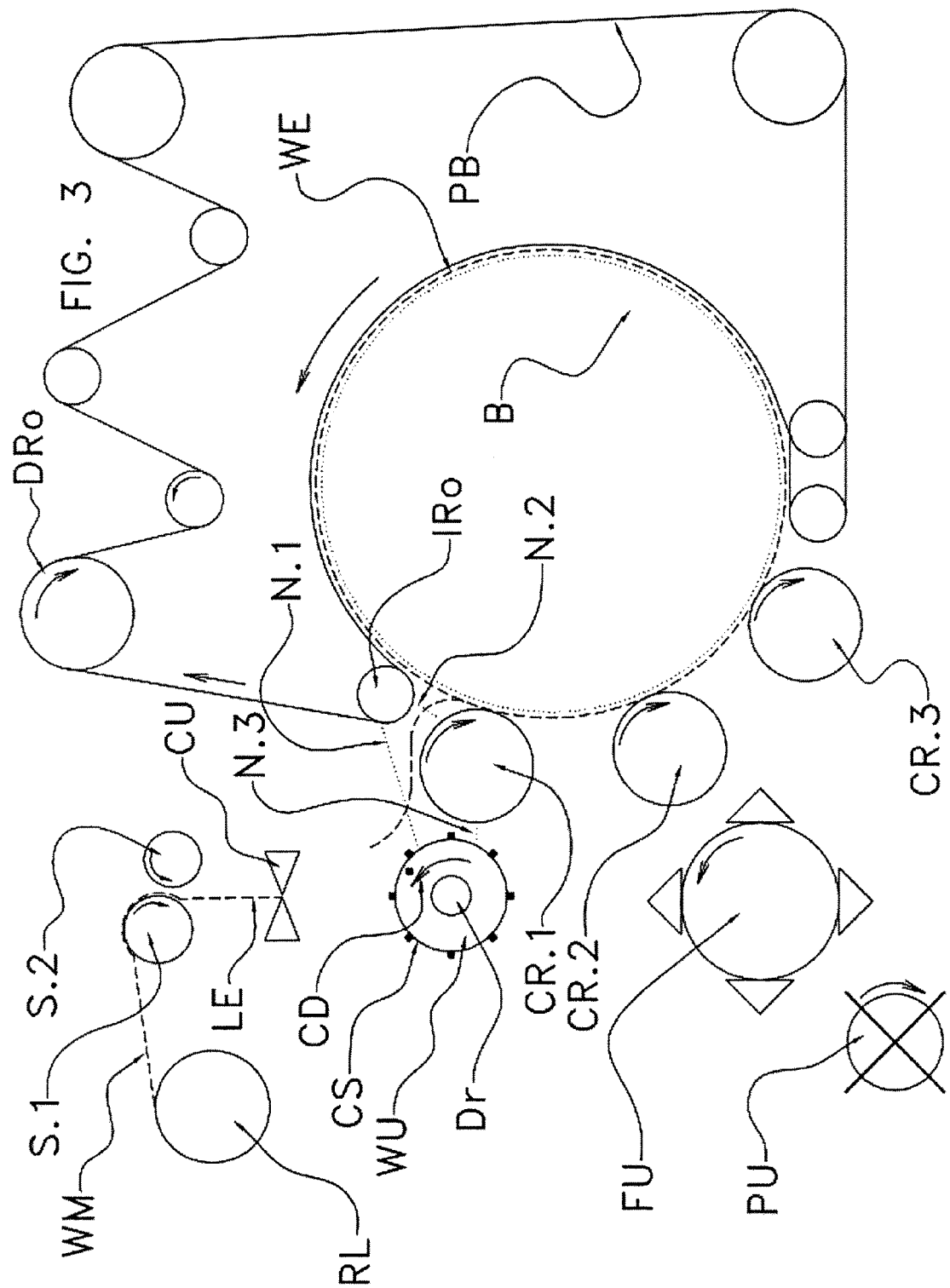
FIG. 3 schematically shows the round-chamber baler of FIG. 2 after having wrapped the bale.

In the embodiment sketched by FIG. 2 and FIG. 3 the baler is stopped such that no further crop material is injected into the chamber. The baler is stopped as soon as the bale B in the chamber is completely created and has to be wrapped. In one embodiment the pick-up unit PU and the material feeding unit FU are also stopped. A wrapping material supplying unit pulls a web of wrapping material from a reservoir, e. g. from a reel RL, by means of two pulling rollers or two spring-mounted levers (arranged like a beak of a duck), e. g. After having pulling the web of wrapping material, a loose end area is formed downwards from the wrapping material supplying unit. The loose end area of the wrapping material sags by force of gravity and is increased while the wrapping material supplying unit continuous to pull the web of wrapping material from the reservoir.

FIG. 1 to FIG. 3 show a reel RL with wrapping material WM in the form of a net. The rotational axis of the reel RL is perpendicular to the drawing plane of FIG. 1 to FIG. 3. The wrapping material WM is held between two pulling rollers S.1, S.2. At least one roller S.1 is driven and rotates the other roller S.2. A biasing member, e.g. a spring, urges the idler roller S.2 against the driven roller S.1. The two pulling rollers S.1, S.2 clamp and convey the web of wrapping material WM. These two rollers S.1, S.2 belong to the wrapping material supplying unit of the embodiment.

In the situation of FIG. 1, the wrapping material supplying unit is in a waiting mode. Thereby the pulling rollers S.1, S.2 are stopped and are in an idler mode and a loose end area LE of the wrapping material WM sags down from the pulling rollers S.1, S.2 which clamp and hold the web of wrapping material WM. The loose end area LE is that part of the web of wrapping material which is already pulled from the reservoir RL and is situated downwards from the two rollers S.1, S.2 of the wrapping material supplying unit.

As soon as the bale B is completely created and the given termination condition is fulfilled, a wrapping trigger signal is automatically created by an electronic control unit mounted on board of the baler or of a pulling vehicle. This wrapping trigger signal transfers the wrapping material supplying unit S.1, S.2 from the waiting mode into an operating mode. A drive starts to rotate the driven roller S.1. The driven roller S.1 rotates the other roller S.2. Both rollers S.1, S.2 rotate in different directions and pull the clamped web of wrapping material from the reel RL.

The two pulling rollers S.1, S.2 pull at the loose end area LE which causes further wrapping material WM to be pulled from the rotating reel RL. The front end of the increasing loose end area LE reaches the conveying surface CS of a wrapping material feeding unit WU. In the embodiment the wrapping material feeding unit WU comprises a roller which is mounted on a shaft or axle Dr. The roller WU can rotate around a rotating axis perpendicular to the drawing plane of FIG. 1 to FIG. 3. The circumferential outer surface of this roller WU forms the conveying surface CS. The shaft Dr may be driven and imply a torque onto the material feeding unit WU. It is also possible that Dr is just an axle carrying the wrapping material feeding unit WU rotatable.

The conveying surface CS is moved along a circular endless loop in a feeding direction FD which is the clockwise direction in the example of FIG. 2. The loose end area LE lies on the conveying surface CS such that the conveying surface CS shifts and/or pulls the loose end area LE. Preferably the conveying surface CS does not urge a tension onto the shifted loose end area LE. The increasing loose end area LE is conveyed through the nip N.1 between the rollers WU and IRo and afterwards through the nip N.2 between the rollers IRo and CR.1 and reaches the surface of the bale B.

In the situation shown by FIG. 2 the front end of the loose end area LE has reached a contact surface between the bale B and the conveying roller CR.1. The conveying roller CR.1 presses the loose end area LE against the surface of the bale B. The conveying roller CR.1 is a part of a wrapping material injection unit and also serves as a pressing roller.

In the figures the wrapping material feeding unit WU comprises a rotating part having the form of a driven roller. The wrapping material feeding unit WU can also comprise an endless belt or a chain providing the conveying surface CS. In all cases the conveying surface CS describes an endless loop while the wrapping material feeding unit WU is moved. In the case of a roller this endless loop is a circular loop. This endless loop enables a continuous operation of the wrapping material feeding unit WU whereas a pusher element necessarily oscillates and therefore works discontinuously.

Preferably the conveying surface CS has some protrusions, e.g. rigid ribs or flexible flaps, for taking and grasping the loose end area LE. These protrusions are sketched in the figures. In the figures the protrusions are rigid ribs. It is also possible to mount flexible flaps at the conveying surface CS such that a flexible flap engages into the nip N.1 or touches the surface of the roller CR.1.

The distance between the two rollers WU and CR.1 (nip N.3) is so small that the loose end area LE cannot drop into the gap between these two rollers but either drops onto the roller WU or onto the roller CR.1 both having protrusions.

A gap (nip N.1) between the wrapping material feeding unit WU and the chamber with the bale B occurs during the entire process of creating and wrapping the bale B. In the embodiment the roller WU is not shifted perpendicular to its rotating axis, i.e. keeps its position with respect to the rollers CR.1, CR.2, IRo. Therefore the wrapping material feeding unit WU does not come in contact with the bale B and does not become dirtied or moistened by the rotating bale B or by crop material rubbed off from the bale B. There is also a gap (nip N.3) between the wrapping material feeding unit WU— or at least the rigid parts of the unit WU—and the conveying roller CR.1 such that these two rollers can be conveyed independently from each other in the same direction and in different directions and do not interfere with each other.

The bale B in the chamber is rotated all the time by the pressure belt PB, the conveying rollers CR.1, CR.2, CR.3 and other elements. The rotating bale B grasps the loose end area LE of the wrapping material WM after the foremost part of the loose end area LE is injected through the nip N.2 into the chamber. This part is pressed against the surface of the rotating bale B. The rotating bale B pulls further wrapping material WM from the reel RL. The two rollers S.1, S.2 are set into a free rolling mode and are rotated as idler rollers by the pulled wrapping material WM. By this switch the wrapping material supplying unit is transferred back into the waiting mode.

In one embodiment the rollers S.1, S.2 are no longer rotated as soon as a given time period has passed. This time period starts when the roller S.1 starts to rotate (operating mode of the wrapping material supplying unit S.1, S.2). The time period is so long that the rotating bale B and the pressing belts PB have securely clamp the web of wrapping material WM before the time period ends.

The bale B is rotated several times such that a required number of layers of wrapping material WM are applied onto the bale B. In one embodiment the number of revolutions of one roller S.1, S.2 is counted. This number serves as a value indicative of the length of the web pulled from the reel RL After having applied the required number of layers, a cutting unit CU severs the web of wrapping material WM wrapped around the bale B, cf. FIG. 3, and separates the layers around the bale B from the wrapping material on the reel RL. A required number of layers have been placed around the bale B and the wrapping procedure is completed. The cutting unit CU is arranged between the rollers S.1, S.2 and the roller WU such that a sagging loose end LE remains upstream of the cutting unit CU. The wrapped bale B is ejected out of the chamber. FIG. 3 shows the baler after having wrapped the bale B. The bale B is entirely wrapped into a wrapping element WE, i.e. into several layers of wrapping material WM.

The invention solves the problem that debris from the rotating bale B or from a conveying unit may be injected into the nip N.1 or into the nip N.2. Injecting debris may be caused by the frictional force exerted onto the rotating bale B or by friction force effectuated by the endless belt PB or the conveying rollers CR.1, CR.2, CR.3. This debris may be an obstacle which inhibits the loose end area LE of the wrapping material WM from being injected into the chamber. In this case the loose end area LE may not reach the rotating bale B but drops into the material feeding unit FU. This may cause a blockade of the baler. To avoid such a blockade, the nips N.1, N.2 are actively cleaned in advance, i.e. before starting the wrapping procedure. According to the invention no time needs to be spent for a specific cleaning step between terminating the creation and wrapping the bale.

According to the invention the nips N.1, N.2 are actively cleaned by the wrapping material feeding unit WU itself and not by a separate cleaning unit for cleaning the nips N.1, N.2. The conveying surface CS is continuously moved in a cleaning direction CD. This cleaning direction CD is different from the feeding direction FD. In the figures the cleaning direction CD is antiparallel to the feeding direction FD. In FIG. 1 and FIG. 3 the conveying surface CS is moved in the cleaning direction CD (anti-clockwise) and in FIG. 2 the conveying surface CS is moved in the feeding direction FD (clockwise). This is achieved by rotating the shaft or axis Dr in the anti-clockwise direction (cleaning direction CD) and in the clockwise direction (feeding direction FD), resp.

In the embodiment a cleaning trigger signal is generated as soon as the bale B is entirely wrapped or is even generated earlier, e.g. if a given number of layers is placed around the bale B. The cleaning trigger signal causes the roller WU to be rotated in the cleaning direction CD.

If the conveying surface CS is moved in the cleaning direction CD, it conveys debris out of the nips N1, N.2. This debris drops onto the crop material feeding unit FU and is later conveyed back into the chamber. The gap N.3 between the conveying surface CS and the conveying roller CR.1 enables to rotate both rollers WU, CR.1 in different directions or in the same direction without interference. The horizontal offset between the conveying surface CS and the roller CR.1 is large enough such that debris conveyed by the conveying surface CS drops onto the feeding unit FU and is not conveyed back to the nip N.2 by the conveying roller CR.1.

According to the embodiment the conveying surface CS is rotated again in the cleaning direction CD as soon as the bale B is entirely wrapped and the web of wrapping material WM is severed—or even earlier but so late that the conveying surface CS rotated in the cleaning direction CD cannot pull the web of wrapping material WM out of the chamber. This situation is shown in FIG. 3. In the situation shown by FIG. 3 the wrapping material WM has just lost contact with the conveying surface CS and cannot be stretched by the conveying surface CS rotating in the cleaning direction CD. As shown in FIG. 3 it is possible to rotate the conveying surface CS again in the cleaning direction CD even before the wrapping procedure has terminated. In one embodiment the conveying surface CS is moved in the cleaning direction CD as soon as the wrapping material supplying unit S.1, S.2 is set into the waiting mode and the rollers S.1, S.2 operate as idler rollers.

In the following the coordination of the pulling rollers S.1, S.2 and the wrapping material feeding unit WU with the conveying surface CS is summarized: While the bale B is created in the bale forming chamber, the pulling rollers S.1, S.2 are in the waiting mode and the conveying surface CS is permanently moved in the cleaning direction CS. The wrapping trigger signal causes the roller S.1 to be rotated, i.e. switches the wrapping material supplying unit S.1, S.2 into the operating mode. The wrapping trigger signal further causes the conveying surface CS to be moved in the feeding direction FD—at the same time or a given (short) time span later.

An injection completed trigger signal is generated if the rotating bale B has securely grasp the injected web of wrapping material WM. As soon as the injection completed trigger signal is generated, the rollers S.1, S.2 are set back into the waiting mode. This injection completed trigger signal can be generated a given time period after the wrapping trigger signal or if it is detected that the wrapping material WM is indeed injected into the chamber and is grasped by the rotating bale B. The injection completed trigger signal can further serve as the cleaning trigger signal. Or the cleaning trigger signal is generated after the injection completed trigger signal. The cleaning trigger signal causes the conveying surface CS to be moved again in the cleaning direction CS.

In the figures a driven shaft or an axis Dr is shown. In one embodiment this driven shaft Dr acts as a drive moving the conveying surface either in the feeding direction FD or in the cleaning direction CD. The rotational axis of this shaft Dr is perpendicular to the drawing plane of the figures and is held by a suitable bearing in the front housing of the baler.

In one embodiment the driven shaft Dr and therefore the wrapping material feeding unit WU is rotated by a hydraulic motor. A hydraulic material, e.g. oil, is moved by a pump driven by an electrical motor and is driven either in one direction for achieving the conveying surface CS to be moved in the cleaning direction CD or in the other direction for achieving the conveying surface CS to be moved in the feeding direction FD. In the preferred embodiment the hydraulic fluid is conveyed in pipelines of an open loop system. The pump conveys the hydraulic material from a reservoir through pipelines to a collecting device. In an alternative embodiment the hydraulic material circulates in a closed loop. In both embodiments, a controlled 4/2 directional valve effectuates the rotation of the roller WU in the cleaning direction CD as well as in the feeding direction FD.

An alternative embodiment for rotating the wrapping material feeding unit WU is a V-belt ("Keilriemen") together with a clutch. A third possible embodiment is a planetary gear with one clutch.

Figure 4:
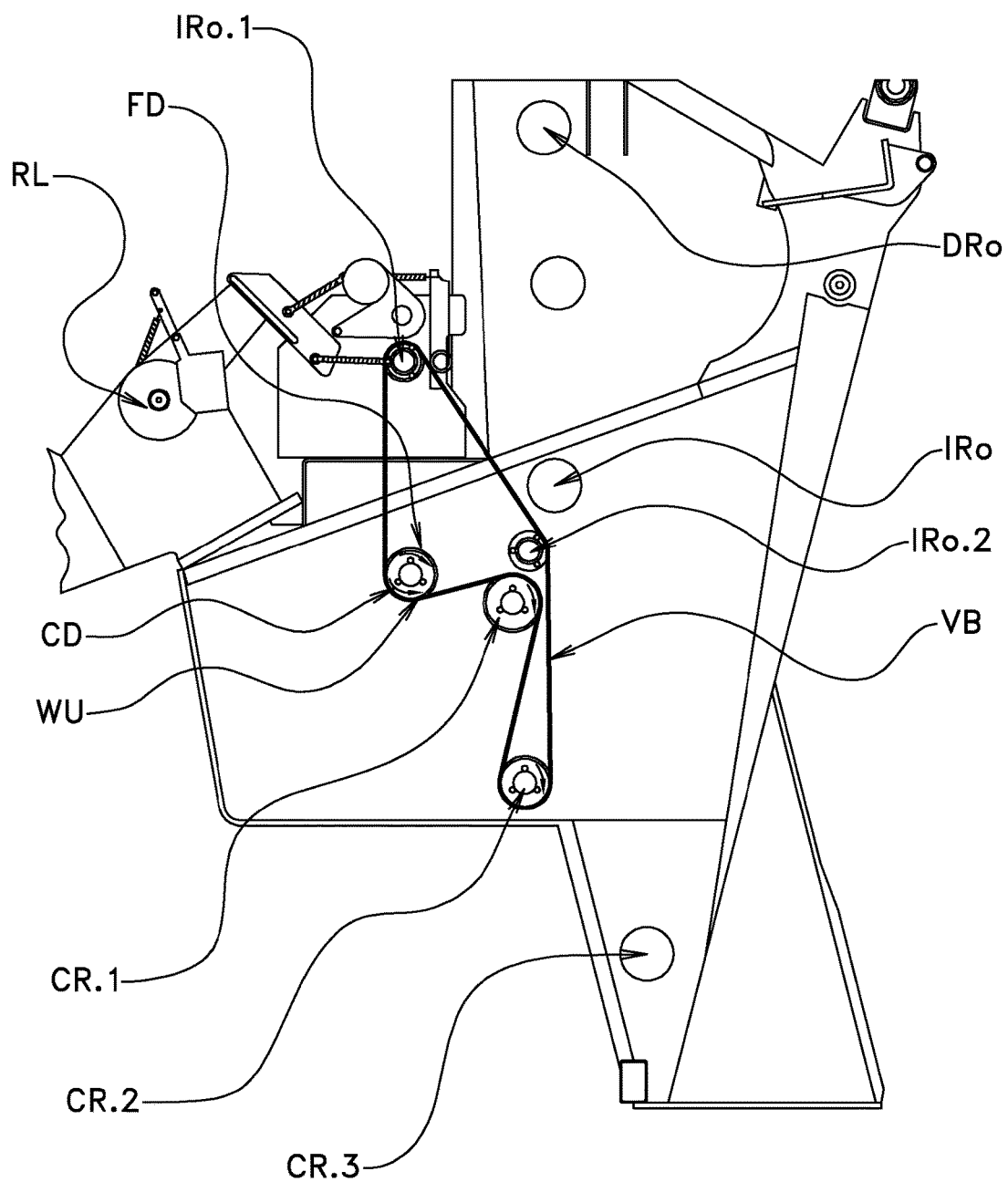
FIG. 4 shows one embodiment for driving the wrapping material feeding unit into two directions.

FIG. 4 shows one embodiment for driving the wrapping material feeding unit WU either in the feeding direction FD or in the cleaning direction CD. A V-belt VB is guided under tension around the following rollers:
the wrapping material feeding unit WU,
the conveying rollers CR.1 and CR.2, and
two further idler rollers IRo.1, IRo.2.

Every conveying roller CR.1 and CR.2 operates as a free wheel clutch when rotating in one direction and drives the V-belt VB when rotating in the other direction. For driving the wrapping material feeding unit WU in the cleaning direction CD (anti-clockwise in FIG. 4) the conveying roller CR.1 drives the V-belt VB (anti-clockwise in FIG. 4). The conveying roller CR.2 runs in a free wheel mode. For driving the wrapping material feeding unit WU in the feeding direction FD (clockwise in FIG. 4) the conveying roller CR.2 drives the V-belt VB (clockwise in FIG. 4). The conveying roller CR.1 runs in a free wheel mode. A control unit switches the conveying rollers CR.1 and CR.2 in a suitable manner.

In one embodiment the wrapping material feeding unit WU is permanently driven such that the conveying surface CS is permanently moved either in the cleaning direction CD or in the feeding direction FD. The conveying surface CS is moved in the cleaning direction CD as long as possible and is moved in the feeding direction FD only as long as required. As long as the bale B is created, the conveying surface CS is moved in the cleaning direction CD and cleans the inlet. If the bale B is completely created and must be wrapped in the chamber, the wrapping trigger signal is generated. This wrapping trigger signal sets the wrapping material supplying unit with the two rollers S.1, S.2 into the operating mode. The two rollers S.1, S.2 pull wrapping material WM from the reel RL. In addition this wrapping trigger signal changes the direction into which the driven shaft Dr moves the conveying surface CS: The conveying surface CS is now moved into the feeding direction FD, cf. FIG. 2.

In an alternative embodiment the wrapping material feeding unit WU is operated in a start-stop manner. As in the embodiment described above, the wrapping trigger signal makes the conveying surface CS to be moved into the feeding direction FD. After having completed the wrapping of the bale B, the conveying surface CS is stopped. During the process of creating a further bale, the conveying surface CS is temporally stopped and only temporally moved in the cleaning direction CD.

In the embodiment shown in FIG. 1 and FIG. 2 the inlet (nips N.1, N.2) is cleaned and debris is removed only by rotating the roller WU with the conveying surface CS in the cleaning direction CD. In a further embodiment this cleaning mechanism using the roller WU is combined with other cleaning mechanisms. A pusher element may push debris from outside into the chamber. This pusher element penetrates the nip N.1 or the nip N.2 or both nips before the wrapping procedure starts. The inlet may also be cleaned additionally by means of a blower which blows a fluid through the nips or a sucking unit which sucks debris out of these nips.

Reference signs used in the claims will do not limit the scope of the claimed invention. The term "comprises" does not exclude other elements or steps. The articles "a", "an", and "one" do not exclude a plurality of elements. Features specified in several depending claims may be combined in an advantageous manner.

| List of reference signs | |
|---|---|
| B | bale of agricultural material in the chamber, is to be wrapped |
| CD | cleaning direction of the roller WU |
| CR.1, CR.2, CR.3 | driven conveying rollers for conveying the bale B in the chamber, serve as starter rollers |
| CS | conveying surface of the wrapping material feeding unit WU |
| CU | cutting unit for severing the web of wrapping material WM |
| Dr | driven shaft for rotating the roller WU |
| DRo | driven roller around which the endless belt PB is guided |
| FD | feeding direction of the roller WU |
| FU | feeding unit for feeding crop material into the bale forming chamber |
| IRo | idler roller around which the endless belt PB is guided |
| LE | sagging loose end area of the wrapping material WM |
| M | material inlet through which crop material is fed into the chamber |
| N.1 | nip between the idler roller IRo and the wrapping material feeding unit WU, belongs to the inlet for wrapping material into the chamber |
| N.2 | nip between the idler roller IRo and the conveying roller CR.1 |
| N.3 | nip between the wrapping material feeding unit WU and the conveying roller CR.1, belongs to the inlet for wrapping material into the chamber |
| PB | endless pressure belt, is guided around the idler roller IRo, the driven roller DRo and other rollers |
| PU | pick-up unit for picking up crop material from the ground |
| RL | reel with wrapping material WM |
| S.1, S.2 | driven rollers of the wrapping material supplying unit, clamp the web of wrapping material WM |
| VB | V-belt for driving the wrapping material feeding unit WU in both directions |
| WE | wrapping element, completely surrounds the bale B with several layers |
| WM | wrapping material, has the form of a net |
| WU | wrapping material feeding unit, has the form of a driven roller |

The invention claimed is:

1. A feeding apparatus for feeding wrapping material towards an inlet of a chamber, in which chamber an object is to be wrapped with wrapping material, the feeding apparatus comprising:
a wrapping material supplying unit,
a wrapping material feeding unit comprising a conveying surface, and
a drive for moving the conveying surface,
wherein the wrapping material supplying unit is adapted for being operated in an operating mode and in a waiting mode,
wherein the wrapping material supplying unit is adapted such that it supplies wrapping material from a reservoir when being operated in the operating mode and it holds wrapping material and keeps the wrapping material in a position spaced-apart from the inlet when being operated in the waiting mode,
wherein the wrapping material supplying unit is adapted for supplying wrapping material such that an increasing loose end area of wrapping material is formed during the operation of the wrapping material supplying unit in the operating mode, wherein the drive is adapted for moving the conveying surface along a first endless loop in a feeding direction such that the loose end area of wrapping material is conveyed towards the inlet and for moving the conveying surface along a further endless loop in a cleaning direction different from the feeding direction such that loose material is conveyed away from the inlet, wherein the drive is adapted for moving the conveying surface in the feeding direction at least while the wrapping material supplying unit is operated in the operating mode, wherein the feeding apparatus is adapted for operating the wrapping material supplying unit in the waiting mode at least while the drive moves the conveying surface in the cleaning direction, wherein the drive for the conveying surface comprises a V belt and a driving mechanism for conveying the V belt in a first direction and in a second direction, wherein the conveying surface is moved by the V belt such that conveying the V belt in the first direction causes the conveying surface being moved in the feeding direction and conveying the V belt in the second direction causes the conveying surface being moved in the cleaning direction, wherein the driving mechanism for conveying the V belt comprises a first conveying member and a second conveying member, and wherein each of the conveying members can be operated in a conveying mode and in an idler mode, and the drive for the conveying surface is arranged such that operating the first conveying member in the conveying mode and operating the second conveying member in the idler mode causes the V belt to be moved in the first direction and operating the first conveying member in the idler mode and operating the second conveying member in the conveying mode causes the V belt to be moved in the second direction.

2. The feeding apparatus according to claim 1, wherein the feeding apparatus is adapted for generating a wrapping trigger signal which switches the wrapping material supplying unit into the operating mode and switches the drive in a mode in which the drive moves the conveying surface in the feeding direction.

3. The feeding apparatus according to claim 1, wherein the feeding apparatus is adapted for generating a cleaning trigger signal after the loose end area has reached the surface of the object in the chamber, and wherein the cleaning trigger signal makes the drive moving the conveying surface in the cleaning direction.

4. The feeding apparatus according to claim 1, wherein the cleaning direction is antiparallel to the feeding direction.

5. The feeding apparatus according to claim 1, wherein the wrapping material feeding unit is adapted such that the drive moves the conveying surface along the first endless loop when moving the conveying surface in the feeding direction and along the further endless loop when moving the conveying surface in the cleaning direction.

6. The feeding apparatus according to claim 1, wherein at least one rigid or flexible protrusion is fixed on the conveying surface.

7. The feeding apparatus according to claim 1, wherein the feeding apparatus is adapted such that a gap between the conveying surface and the wrapping material occurs as long as the conveying surface is moved in the cleaning direction.

8. The feeding apparatus according to claim 1, wherein the feeding apparatus is adapted such that the conveying surface is moved in the cleaning direction only if a gap between the wrapping material and an object to be wrapped occurs.

9. The feeding apparatus according to claim 1, wherein the feeding apparatus further comprises a wrapping material injection unit for injecting the loose end area through the inlet into the chamber such that the injected loose end area comes into contact with the object in the chamber, and wherein a gap between the wrapping material feeding unit and the wrapping material injection unit occurs at least as long as the conveying surface is moved in the cleaning direction.

10. A wrapping arrangement comprising:

the feeding apparatus according to claim 1 for feeding wrapping material towards the inlet, including the chamber for containing the object to be wrapped with wrapping material and the inlet adapted for enabling the injection of wrapping material into the chamber; and a wrapping mechanism configured to wrap an object contained in the chamber into injected wrapping material.

11. A bale forming apparatus comprising:

the feeding apparatus according to claim 1 for feeding wrapping material towards the inlet, including the chamber which is adapted for containing the loose material which is injected into the chamber and the inlet which is adapted for enabling the injection of wrapping material into the chamber;

a conveying apparatus for conveying the loose material which is in the bale forming chamber such that the object is formed under pressure from loose material in the chamber; and a wrapping mechanism configured to wrap in the chamber the object formed in the chamber.

12. A method for feeding wrapping material towards an inlet of a chamber in which an object is automatically to be wrapped with wrapping material, the feeding method is automatically performed by using a feeding apparatus, comprising:

a wrapping material supplying unit which can operated in an operating mode and in a waiting mode;

a wrapping material feeding unit comprising a conveying surface; and a drive for moving the conveying surface, wherein the method comprises the steps of:
  feeding; and
  cleaning, wherein the step of feeding further comprises the steps of:
  operating the wrapping material supplying unit in the operating mode, the wrapping material supplying unit operated in the operating mode supplying wrapping material from a reservoir; and
  by supplying the wrapping material, creating an increasing loose end area of wrapping material;

wherein the drive moves the conveying surface along a first endless loop in a feeding direction, and the conveying surface moved in the feeding direction conveys the increasing loose end area towards the inlet;

wherein the step of cleaning further comprises the steps of:
  operating the wrapping material supplying unit in the waiting mode, the wrapping material supplying unit operated in the waiting mode holding wrapping material and keeping the wrapping material in a position spaced-apart from the inlet;
wherein the drive moves the conveying surface along a further endless loop in a cleaning direction being different from the feeding direction such that loose material is conveyed away from the inlet, and
wherein an intermediate procedure is performed between the step of cleaning and the step of feeding, the intermediate procedure comprising the steps of:
operating the wrapping material supplying unit in the waiting mode; and
moving the conveying surface in the feeding direction with the drive.

13. The feeding method according to claim 12, wherein a cleaning trigger signal is generated after the loose end area has reached a surface of the object in the chamber and the cleaning trigger signal causes the drive to move the conveying surface in the cleaning direction.

14. The feeding method according to claim 13, wherein the cleaning trigger signal further causes the wrapping material supplying unit to be switched from the operating mode into the waiting mode.

15. The feeding method according to claim 13, wherein the step of feeding further comprises the step of:
conveying the loose end area through the inlet into the chamber,
wherein the method further comprises the steps of:
placing several layers of wrapping material around the object in the chamber; and
generating the cleaning trigger signal as soon as a given number of layers is placed around the object in the chamber.

16. The feeding method according to claim 12, wherein the step of feeding is performed after the step of cleaning.

17. The feeding apparatus according to claim 2, wherein the feeding apparatus is adapted for generating a cleaning trigger signal after the loose end area has reached the surface of an object in the chamber, and wherein the cleaning trigger signal makes the drive move the conveying surface in the cleaning direction.

* * * * *